United States Patent [19]

Price et al.

[11] Patent Number: 5,418,796
[45] Date of Patent: May 23, 1995

[54] SYNERGISTIC MULTIPLE BIT ERROR CORRECTION FOR MEMORY OF ARRAY CHIPS

[75] Inventors: Donald W. Price, Lake Katrine; Yee-Ming Ting, Cornwall, both of N.Y.

[73] Assignee: International Business Machines Corporation, Armonk, N.Y.

[21] Appl. No.: 675,994

[22] Filed: Mar. 26, 1991

[51] Int. Cl.[6] .......................................... H03M 13/00
[52] U.S. Cl. ..................................... 371/39.1; 371/37.2
[58] Field of Search ..................... 371/39.1, 40.1, 37.2, 371/37.7, 40.2, 21.1, 68.3, 37.3, 13, 38.1

[56] References Cited

U.S. PATENT DOCUMENTS

| | | | |
|---|---|---|---|
| 3,659,088 | 4/1972 | Boisvert, Jr. | 371/21.6 |
| 3,755,779 | 8/1973 | Price | 340/146.1 |
| 3,893,071 | 7/1975 | Bosssn et al. | 340/146.1 AL |
| 4,117,458 | 9/1978 | Burghard et al. | 371/37.2 |
| 4,139,148 | 2/1979 | Scheuneman et al. | 235/312 |
| 4,236,247 | 11/1980 | Sundberg | 371/38 |
| 4,296,494 | 10/1981 | Ishikawa et al. | 371/13 |
| 4,319,357 | 3/1982 | Bossen | 371/38 |
| 4,335,459 | 6/1982 | Miller | 371/38 |
| 4,464,753 | 8/1984 | Chen | 371/38 |
| 4,504,948 | 3/1985 | Patel | 371/38 |
| 4,509,172 | 4/1985 | Chen | 371/38 |
| 4,525,838 | 6/1985 | Patel | 371/37 |
| 4,612,640 | 9/1986 | Mehrotra et al. | 371/40.1 |
| 4,689,792 | 8/1987 | Traynor | 371/37.2 |
| 4,745,604 | 5/1988 | Patel et al. | 371/37.2 |
| 4,775,979 | 10/1988 | Oka | 371/39 |
| 4,881,232 | 11/1989 | Sako et al. | 371/40.1 |
| 5,058,115 | 10/1991 | Blake et al. | 371/40.1 |

OTHER PUBLICATIONS

Hsiao, "A Class of Optimal Minimum Odd-weight-column SEC-DEC Codes", Jul. 1970, pp. 395–401, IBM Journal Research and Development.

Chen et al., "Error-Correcting Codes for Semiconductor Memory Applications: A State-of-the-Art Review", Mar. 1984, pp. 124–134, IBM Journal Research and Development.

*Primary Examiner*—Robert W. Beausoliel, Jr.
*Assistant Examiner*—Phung M. Chung
*Attorney, Agent, or Firm*—Floyd A. Gonzalez; James E. Murray

[57] ABSTRACT

A two-level multiple bit error correction scheme includes at the first level a memory chip with a memory error detection capability that produces a chip error signal (CES) when it detects errors in the bits leaving that chip and at the second level an off-chip ECC facility which interprets generated syndrome bits and chip error signals in order to determine which bits are bad. There are two types of codes distinguished by the absence or presence of parity bits. The use of parity bits allows for the detection of single bit errors in data read from the chip. Therefore, the CES is active only for detected multiple bit errors. Chips not using parity bits are less expensive, but the CES must be active for both single bit and multiple bit errors.

7 Claims, 6 Drawing Sheets

C0 = D00 ⊕ D01 ⊕ D02 + ... + D07
C1 = D10 ⊕ D11 ⊕ D12 + ... + D17
C2 = D20 ⊕ D21 ⊕ D22 + ... + D27
C3 = D30 ⊕ D31 ⊕ D32 + ... + D37

ASSUMED MEMORY CHIP DATA WIDTH IS FOUR BITS

FIG. 5

SYNERGISTIC MULTIPLE BIT ERROR CORRECTION FOR MEMORY OF ARRAY CHIPS

BACKGROUND OF THE INVENTION

1. Field of the Invention

The present invention generally relates to error detection and correction in data read from memory or array chips and, more particularly, to the cooperative use of two facilities, for example, one on the chip to detect multiple bit errors and one off the chip to correct multiple bit errors. More generally, the invention contemplates a two level error detection/correction with the levels being chip level, board level or any other packaging level.

2. Description of the Prior Art

Error-correcting codes (ECCs) are used to enhance system reliability and data integrity of computer semiconductor memory systems. ECCs have proved to be a cost-effective means of maintaining a high level of system reliability. Early ECCs used in computer memory systems were single-error-correcting and double-error-detecting (SEC-DED) codes invented by R. W. Hamming as described in "Error Detecting and Error Correcting Codes", *Bell System Technical Journal*, April 1950, pp.147–160. U.S. Pat. No. 3,755,779 to Price teaches a basic SEC-DED method of error correction/detection. While only one error can be corrected with these codes, the double error detecting capability guards against data loss. M. Y. Hsiao in "A Class of Optimal Minimum Odd-Weight-Column SEC-DED Codes", *IBM Journal of Research and Development*, July 1970, pp. 395–401, disclosed a new class of SEC-DED codes which provided an improvement of Hamming codes in speed, cost and reliability of the decoding logic. The logic is offered by several semiconductor manufacturers such as, for example, the AM2960 and AMZ8160 of Advanced Micro Devices, the MC68540 of Motorola and the SN54/74 LS630 and LS631 of Texas Instruments.

An improvement on the basic SEC-DED code is disclosed by Bossen in U.S. Pat. No. 4,319,357. Bossen uses a SEC-DED code in a memory system to correct one fixed error and one transitory error in a data word. The erroneous data word and syndrome generated by the error correcting code circuitry are saved while the memory location of the flawed word is checked to determine the location of the one fixed error. A "syndrome" is then generated for the word assuming only a single fixed error in the location and, thereafter, the generated and saved syndromes are Exclusive ORed together to obtain another syndrome locating the position of the transitory error. With both errors located, the word is corrected by inverting the erroneous bits.

To increase the level of reliability of memory systems of increasing size and density, double-error-correcting, triple-error-detecting (DEC-TED) codes are used. Such codes can be constructed based on well known BCH coding theory as described, for example, by W. W. Peterson and E. J. Weldon, Jr., in Error Correcting Codes, MIT Press (1972). U.S. Pat. No. 4,464,753 to Chen discloses a modularized error correction apparatus for correcting package errors by expanding an N-bit SEC-DED code to cover N packages of M bits each such that the Exclusive OR of all M-bit single bit error syndromes in any given package results in a composite "syndrome" which is unique for each package. In U.S. Pat. No. 4,509,172, Chen expands on this by disclosing a DEC-TED code that uses syndromes developed by a parity check matrix H to perform error correction. Chen also teaches how to detect errors without applying miscorrection. U.S. Pat. No. 4,775,979 to Oka builds on the Chen approach and, like Chen, uses a parity check matrix H, but in addition to correcting random errors, Oka corrects a block error by adding a plurality of unit matrices to the parity check matrix.

DEC-TED codes, however, require a large number of check bits than a SEC-DED code and, correspondingly, more complex hardware to implement the functions of error correction and error detection. C. L. Chen and M. Y. Hsiao in "Error-Correcting Codes for Semiconductor Memory Applications: A State-of-the-Art Review", *IBM Journal of Research and Development*, vol. 28, no. 2, March 1984, pp. 124–134, describe four classes of error-correcting codes appropriate for semiconductor memory designs. For each class of codes, the number of check bits required for commonly used data lengths is provided. The implementation aspects of error correction and error detection are also discussed, and certain algorithms useful in extending the error-correcting capability for the correction of soft errors such as α-particle-induced errors are examined in some detail.

Another approach taken in the prior art is disclosed in U.S. Pat. No. 4,335,459 to Miller. Miller proposes "on chip" ECC logic to improve manufacturing yield and chip reliability. In this scheme, the user is not aware of the chip's increased internal storage and error correction circuitry, the only indication of these characteristics being the fact that the memory chips can be used without external ECC logic. Nevertheless, Miller suggests that his memory chip could be used with external ECC logic to provide multiple bit error correction in much the same manner that Bossen uses a SEC-DED code to correct more than one error. In this case, the "on-chip" and "off-chip" ECC logic functions independently.

In large processor conventional memory systems which use SEC-DED codes for accesses to memory, these memory systems generally are designed using a "by one" (×1) memory chip organization. For example, in the IBM 3090 family of computers, a 1 MByte ×1 memory chip organization is employed. The SEC-DED code corrects all single chip failures and detects almost all multiple bit failures.

As memory chip densities increase (bits per chip) and/or as the need to have more memory interleaves is demanded (as in a multi-processor "super computer" design), then a multiple bit memory chip output will be required. For example, a chip organization of 512 KBytes×9 might be used. In such a system, it will still be desirable to correct any single memory chip failure (up to 9 bits) and detect multiple failures. Standard SEC-DED codes do not solve the problem. Other Error Checking and Correcting (ECC) codes have been designed to attack this problem; however, the cost to implement these codes in both logic and associated memory chip overhead is prohibitive.

SUMMARY OF THE INVENTION

It is therefore an object of the present invention to provide an inexpensive multiple error detection and correction facility for memory or array chips.

It is another object of the invention to provide a memory that implements an error correction scheme which minimizes overhead and reduces logic cost, yet is capable of detecting and correcting all errors due to a single memory chip failure.

It is yet another, more specific object of the invention to provide a two-level memory or array chip error detection/correction scheme that allows more chip failures while minimizing the number of ECC bits required per level.

According to the invention, the problem is solved by the cooperative use of two facilities. These facilities constitute two levels of packaging of the memory system. In a preferred embodiment of the invention, the first level is a memory chip error detection capability which is contained on the memory chip itself and produces a chip error signal whenever a read error is detected on bits leaving that specific chip. That is, this signal is active only when an error in multiple output bits is detected. In this embodiment, parity bits are added to the data bits relieving the first level of the necessity of detecting single bit errors before the data is read from the chip itself. The parity bits are, however, optional. If the parity bits are omitted, the first level error detection on the chip is required to detect single bit errors as well as multiple bit errors so that the chip error signal will be active in the single bit in error case as well as when an error in two or more output bits is detected. The second level is implemented as a single chip multiple bit error correction code external to the memory chips and based on the number of bits accessed from memory. The second level includes a syndrome generator and responds to the syndrome bits as well as the chip error signals to signal the central processing unit whether no error or correctable error or a non-correctable error condition exists. In the case of a correctable error, data correction logic corrects multiple bit errors.

BRIEF DESCRIPTION OF THE DRAWINGS

The foregoing and other objects, aspects and advantages will be better understood from the following detailed description of a preferred embodiment of the invention with reference to the drawings, in which:

FIG. 5 is an H-matrix of a 45,32 error correction code according to another aspect of the invention.

DETAILED DESCRIPTION OF A PREFERRED EMBODIMENT OF THE INVENTION

Chen and Hsiao, supra, describe the concept of an rxn parity check matrix H (hereinafter H-matrix) used to describe a binary (n,k) linear block code, where an n-bit codeword contains k data bits and $r=n-k$ check bits. A matrix V is defined as a codeword if and only if $H \cdot V'=0$, where V' denotes the transpose of V. The encoding process consists of generating r check bits for a set of k data bits. The H-matrix is expressed as $H=[P, I_r]$, where P is an rxk binary matrix and $I_r$ is the rxr identity matrix. The first k bits of a codeword are designated as data bits, and the last r bits are designated as check bits. If U is a word read from memory and the original codeword is V, the error matrix E is defined as $U=V+E$. To determine whether U is in error, an r-bit syndrome S is calculated as $S=H \cdot U'=H \cdot (V'+E')=H \cdot E'$. Thus, if S is an all-zeros vector, the word U is assumed to be error-free; otherwise, S is used to determine the error vector. This basic notation is used in the following description of the invention.

Figure 1:
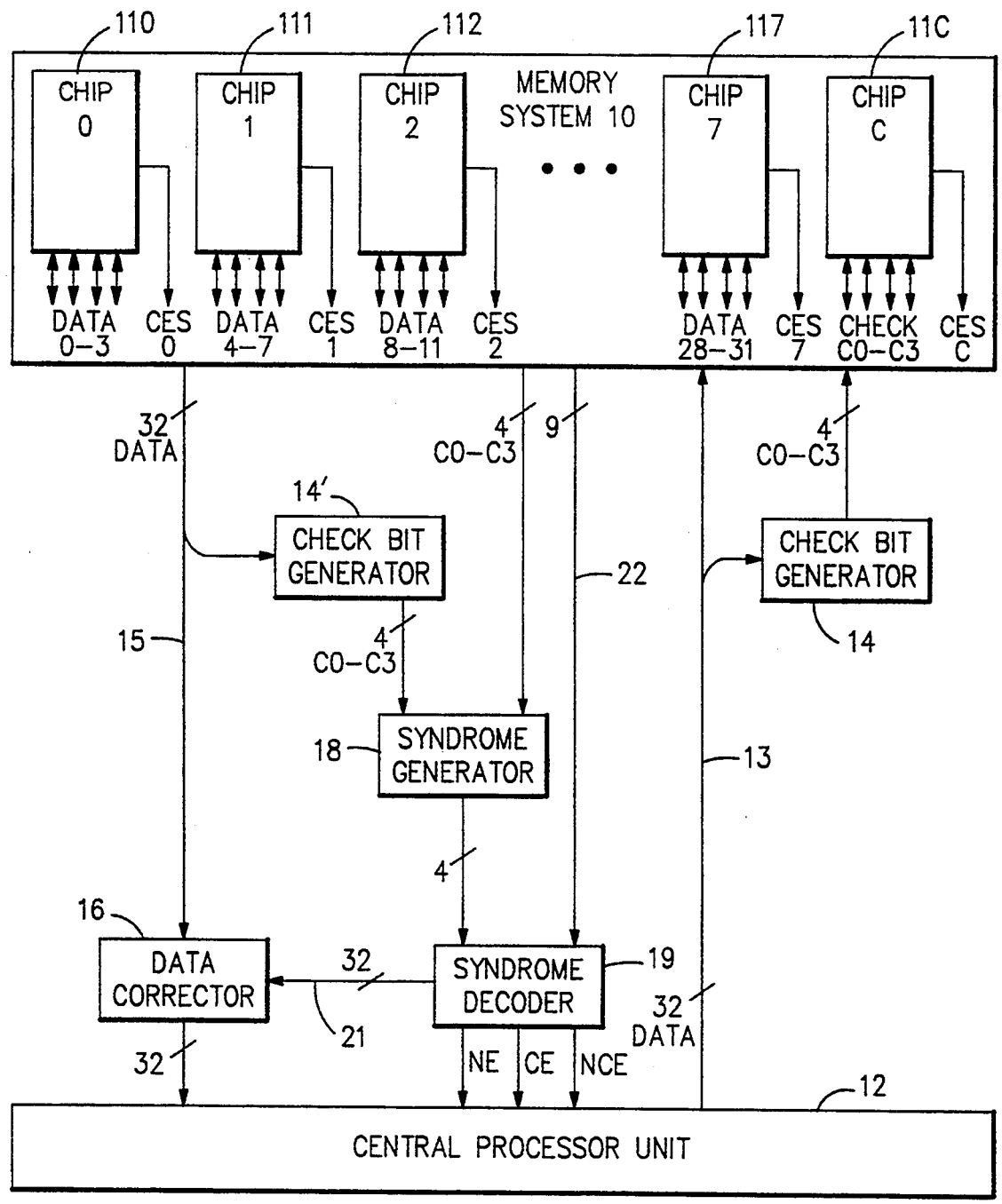
FIG. 1 is a block diagram of an implementation of a two-level error detection and correction system according to the invention.

Referring now to the drawings, and more particularly to FIG. 1, there is shown a block diagram of a two-level error detection and correction implementation according to the invention. A memory system 10 stores data from a central processor unit (CPU) 12, and the CPU 12 accesses the memory system 10 to retrieve data. In the example shown, data words 32 bits wide are stored in the memory system 10 in a plurality of memory chips 110, 111, 112, . . . , 117, and 11C. The first eight of these chips store data, while the ninth chip 11C stores check bits, as described in more detail hereinafter. The 32 data bits on line 13 are sent to the memory system 10 to be stored in the memory chips 110 to 117 and also the check bit generator 14 to generate the check bits $C_0$ to $C_3$ stored in chip 11C.

The 32 data bits read out of the memory system 10 on line 15 go to both a data corrector 16 and a check bit generator 14'. The check bit generator 14', like the check bit generator 14, generates check bits $C_0$ to $C_3$ and, in a practical implementation, the check bit generators 14 and 14' would be one and the same. The check bit generators 14 and 14' are an Exclusive OR tree.

The check bits $C_0$ to $C_3$ from the check bit generator 14' and the check bits $C_0$ to $C_3$ read out of the memory chip 11C are compared in a syndrome generator 18 to produce a syndrome $S_i$ for the codeword read out of the memory system 10. The syndrome $S_i$ is then supplied to a syndrome decoder 19 which generates an output on line 21 to the data corrector 16 to correct the data read out of the memory system 10 on line 15. The basic construction of the syndrome decoder comprises, for the example shown, 32 2-way AND gates and additional logic. The additional logic provides outputs to the CPU 12 indicating either no error (NE), no error or correctable error (CE), or non-correctable error (NCE). The construction of the data corrector 16 comprises, again for the example shown, 32 2-way Exclusive OR gates.

The error detection/correction circuit shown in FIG. 1 as described thus far is conventional and, in fact, typical of many SEC-DED memory systems. The error detection/correction circuit described above is "off-chip" or, more generally described with respect to the present invention, the second level. As shown in FIG. 1, the present invention contemplates, in addition to this second level, a first level, in this case "on-chip", of error detection. Thus, each of the memory chips 110 to 11C produces, in addition to the 4-bit output, a chip-error signal (CES). This CES is produced by "on-chip" error detection logic and is active whenever an error is detected in a word read out of the memory array for that chip. Since in the example shown in FIG. 1 there are nine memory chips 110 to 11C, there are nine CES signals on line 22 which are supplied to the syndrome decoder 19 in addition to the 4-bit syndrome $S_i$ from the syndrome generator 18.

Figures 2, 3:
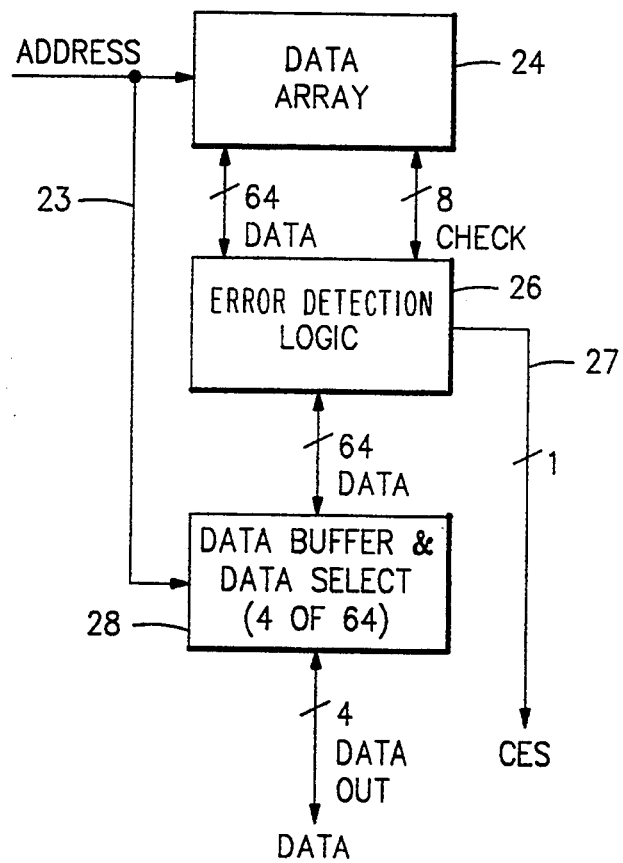
FIG. 2 is a block diagram of the on-chip functions of the two-level error detection and correction system according to the invention.
FIG. 3 is an H-matrix of a 36,32 error correction code according to one aspect of the invention.

Turning now to FIG. 2, there is shown a block diagram of a typical one of the memory chips 110 to 11C. The chip comprises a memory array 24 in which is stored data or, in the case of chip 11C, check bits. An address from the CPU 12 on line 23 is supplied to the memory array 24 which provides 64 data bits and eight check bits as an output to the error detection logic 26. The error detection logic 26 generates the CES signal on line 27, and this signal is active (i.e., a logical "1") whenever an error is detected in the 72 bit (64 data & 8 check) internal error detection code "word". Meanwhile the 64-bit data "word" is passed to a data buffer and 4 of 64 select circuit 28 which also receives the address on line 23. The select circuit 28 outputs four data bits as the data output of the chip. Note that the CES signal is made active whenever an error(s) is detected in the internal 64-data bit on-chip word. The detected error(s) may or may not be in the actual four bits that are read out by the data select circuit 28. The point is that if any of the four output data bits is in error, the CES signal will be active; however, the fact that the CES signal is active does not imply that any of the four output data bits is in error. An active CES signal only means that at least one of the 64 bits read out of the data array was detected to be in error.

FIG. 3 shows an example of an H-matrix for a (36,32) error correction code. This matrix assumes a memory chip data width of four bits, as shown in FIGS. 1 and 2. The CES signal from the ECC logic 26 on a memory chip is active whenever a single bit error exists in the chip data bits or a multiple bit error exists in the chip data bits.

In the following equations, the mathematical notation $\wedge$ represents the logical AND operation and the notation $\vee$ represents the logical OR operation. Also, the logical identity $\overline{A} \vee \overline{B} = \overline{A \wedge B}$ defining the logical NOR operation may be employed in implementing the equations. The ECC equations for the (36,32) code shown in FIG. 3 are as follows:

---

Inputs to Syndrome Decoder 19

$CES_0, \ldots, CES_7, CES_c$ - memory chip error signals
$S_0, S_1, S_2, S_4$ - four syndrome bits from $C_0, C_1, C_2, C_3$ Chip Error Indications $Chip_0\ Error = C_0E = \overline{CES_0} \wedge \overline{CES_1} \wedge \overline{CES_2} \wedge \ldots \wedge \overline{CES_c}$
$Chip_1\ Error = C_1E = \overline{CES_0} \wedge CES_1 \wedge \overline{CES_2} \wedge \ldots \wedge \overline{CES_c}$
.
.
.
$Chip_7\ Error = C_7E = \overline{CES_0} \wedge \overline{CES_1} \wedge \ldots \wedge \overline{CES_7} \wedge \overline{CES_c}$
$Chip_c\ Error = C_cE = \overline{CES_0} \wedge \overline{CES_1} \wedge \ldots \wedge \overline{CES_7} \wedge CES_c$ No Error Or Correctable Error Indication $CE = C_0E \vee C_1E \vee \ldots \vee C_7E \vee C_cE$ No Error Indication $NE = \underbrace{(\overline{S_0} \wedge \overline{S_1} \wedge \overline{S_2} \wedge \overline{S_3})}_{\text{No Active Syndrome Bits}} \wedge \underbrace{(CE \vee (\overline{C_0E} \wedge \overline{C_1E} \wedge \ldots \wedge \overline{C_cE}))}_{\text{One or No Chip Error Signals}}$ Individual Correct Bit Indications $CB_{00} = S_0 \wedge C_0E$
$CB_{01} = S_1 \wedge C_0E$  $\Big\}$  $Chip_0$
$CB_{02} = S_2 \wedge C_0E$
$CB_{03} = S_3 \wedge C_0E$
$CB_{10} = S_0 \wedge C_1E$
.
.
.
$CB_{ij} = S_i \wedge C_jE$
.
.
.
$CB_{70} = S_0 \wedge C_7E$
$CB_{71} = S_1 \wedge C_7E$  $\Big\}$  $Chip_7$
$CB_{72} = S_2 \wedge C_7E$
$CB_{73} = S_3 \wedge C_7E$ Non-Correctable Error Indication

---

$NCE = \overline{NE} \wedge \overline{CE}$

---

Figure 4A:
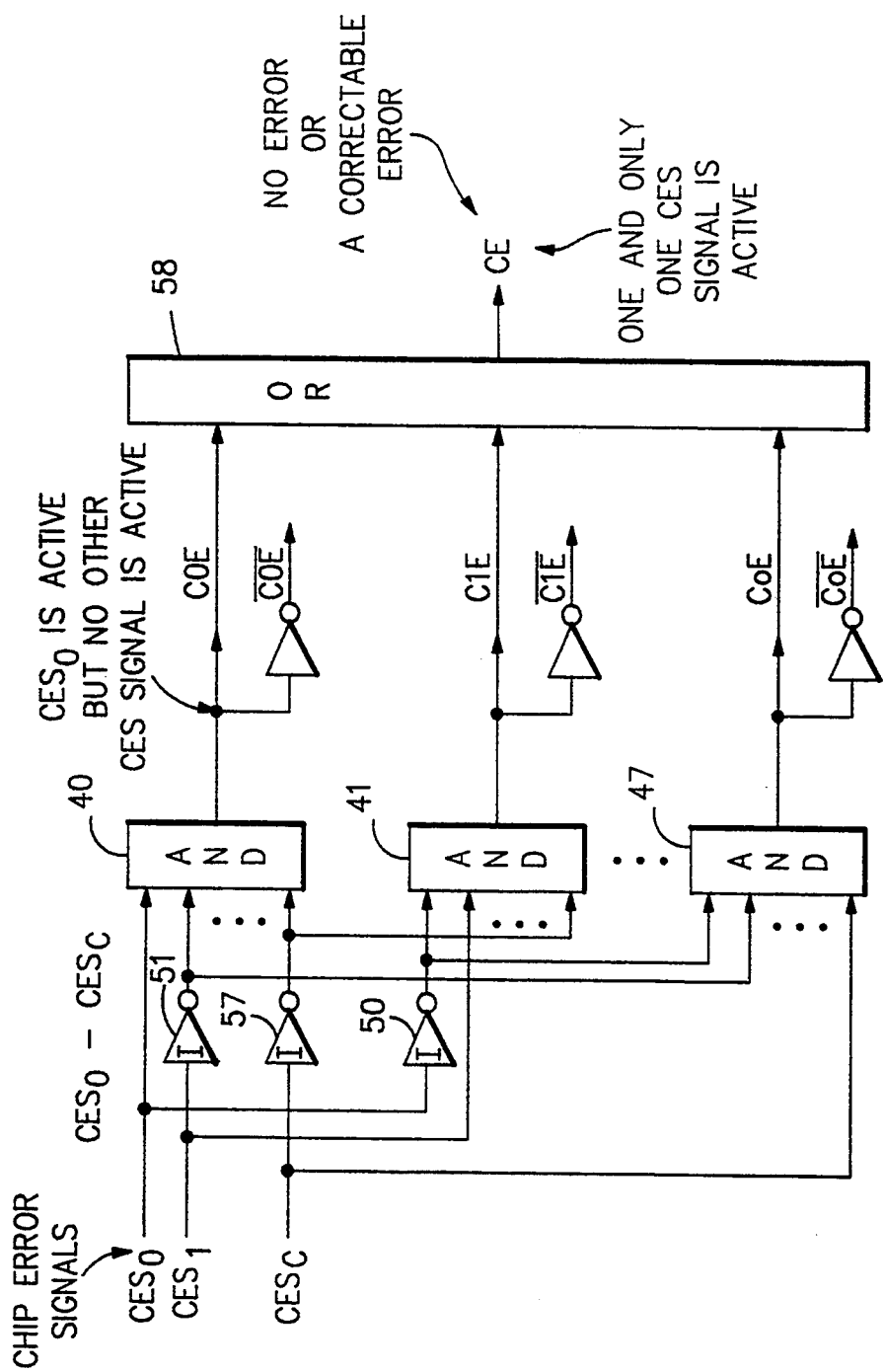
FIGS. 4A, 4B and 4C are logic diagrams of the syndrome decoder shown in the embodiment of FIG. 1.
Figure 4B:
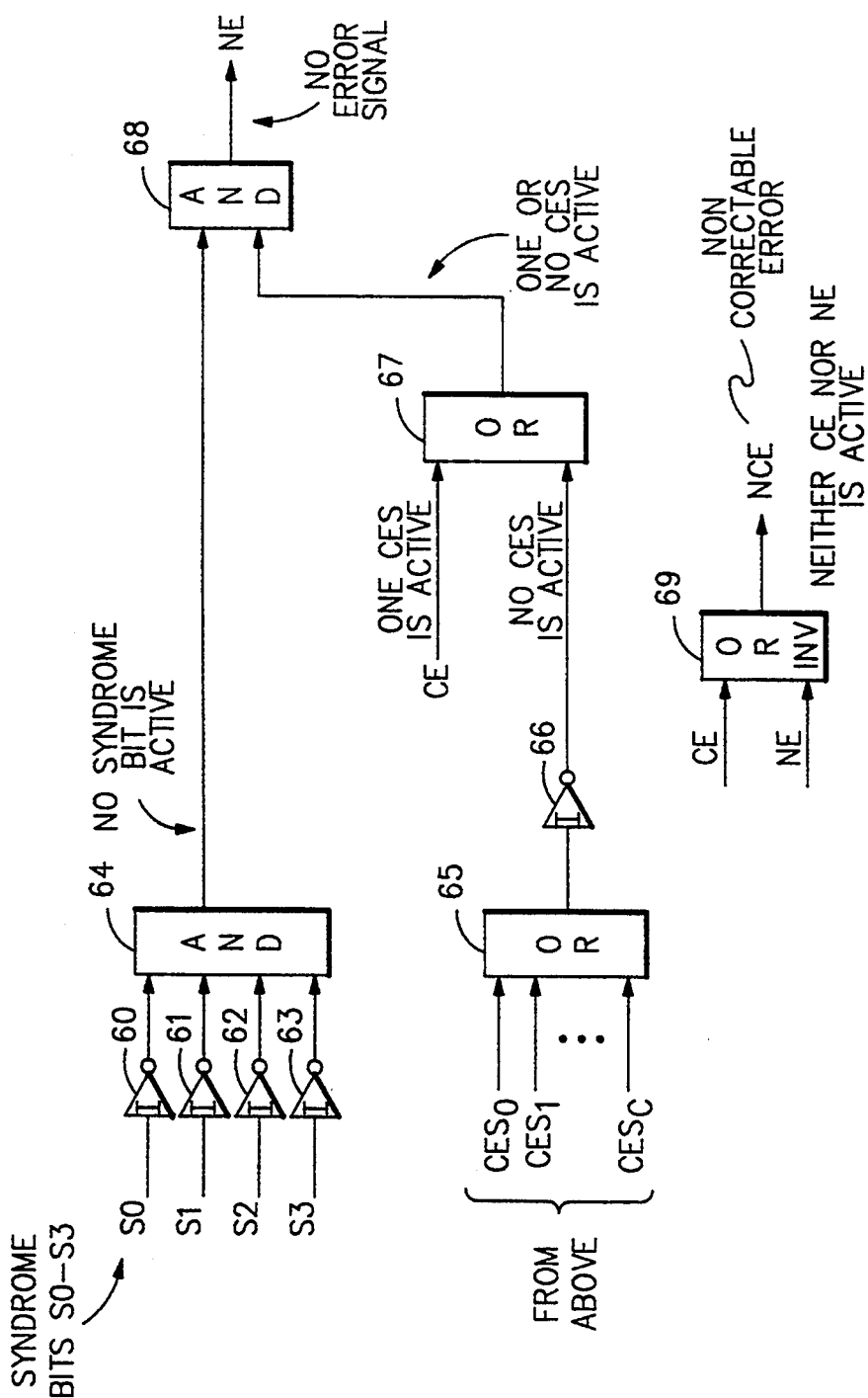
Figure 4C:
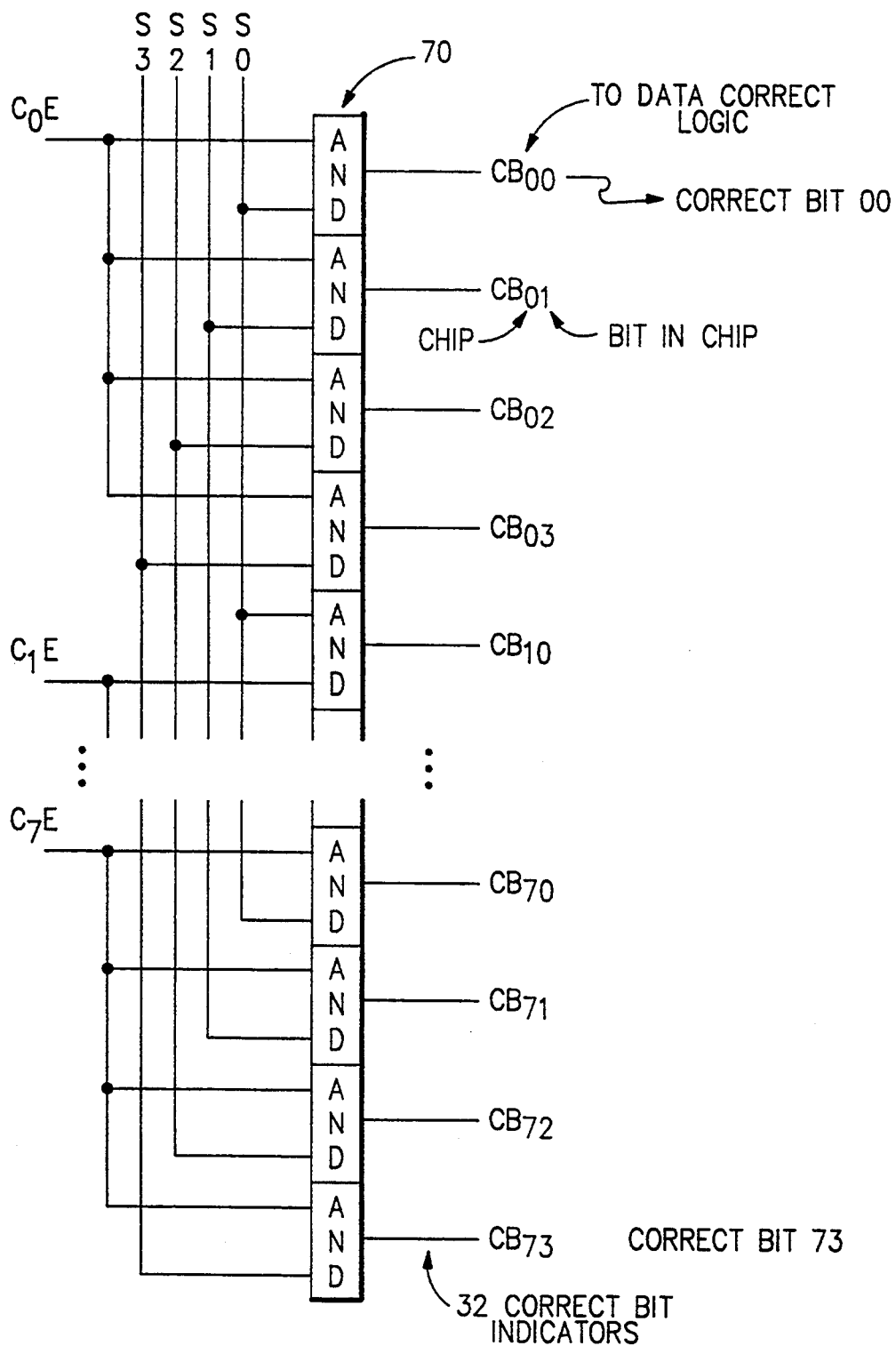

FIGS. 4A, 4B and 4C show, for the example illustrated in FIGS. 1 and 2, the logic diagrams of the circuitry of the syndrome decoder 19. This circuitry implements the above equations. Referring first to FIG. 4A, the memory chip error signals $CES_0$ to $CES_c$ are input to a plurality of 8-way AND gates 40 to 47, respectively. Each of these signals are inverted in inverters 50 to 57, respectively, and the inverted signals are input to the other seven AND gates. The outputs of the AND gates 40 to 47 are, therefore, the chip error indication signals $C_0E$ to $C_cE$ which are input to OR gate 58 to generate the signal CE. The signal CE indicates that one and only one CES signal is active signifying either a correctable error or no error. That is, a CES signal may be active because an error was detected by the on-chip ECC logic in the 64 bits read out of the array, but there may be no error in the four bits selected from the 64 that are actually read out of the chip.

FIG. 4B shows the circuitry for generating the no error signal NE. The syndrome bits from syndrome generator 18 are each inverted by respective inverters 60 to 63, and the inverted syndrome bits are input to AND gate 64. Thus, an output of the AND gate 64 indicates that no syndrome bit is active. Obviously, the four inverters 60 to 63 and the AND gate 64 can be replaced by a single NOR gate. Meanwhile, the chip error signals $CES_0$ to $CES_c$ are input to OR gate 65, the output of which is inverted by inverter 66. An output from inverter 66 indicates that no chip error signal is active. Again, the OR gate 65 and the inverter 66 can be replaced by a single NOR gate. The correctable error signal CE from OR gate 58 in FIG. 4A and the output of inverter 66 are input to an OR gate 67 which provides an output indicating that one or no CES signal is active. This output and the output from AND gate 64 are input to AND gate 68 which generates the no error signal NE. The non-correctable error signal NCE is generated by NOR gate 69 which has as its inputs the CE signal from OR gate 58 and the NE signal from AND gate 68. Thus, if neither CE nor NE is active, the output of NOR gate 69 will be active providing an indication to the CPU that a non-correctable error has been detected.

FIG. 4C shows the generation of the individual correct bit indications. The chip error signals $C_0E$ to $C_cE$ generated by the respective AND gates 40 to 47 in FIG. 4A are input to the decoder matrix 70. This matrix is composed of 32 2-way AND gates wherein each of the chip error signals are combined with a respective one of the syndrome bits $S_0$ to $S_3$ from the syndrome generator 18 to generate the appropriate correct bit indications for the data correct logic in data corrector 16. In the symbology adopted, the first, digit of the subscript designates the chip and the second digit designates the bit in the chip. Thus, a correct bit indication $CB_{42}$ means correct bit two in chip four.

The following table summarizes the actions taken by the two-level error detection/correction system according to the invention.

| MEMORY WITH ON-CHIP ECC AND EXTERNAL ECC CODE | | | |
|---|---|---|---|
| Actual Error Condition | External ECC Syndrome | Number Active CES | System ECC Action |
| No Error | No Error | None | No Error |
| No Error | No Error | One | No Error (Error is in data not being read out) |
| Single Chip Error | Any Syndrome | One | Correct Error(s) |
| Any | Any Syndrome | Two or More | Non-Correctable Error (detected) |
| Any | Any Syndrome | None | Non-Correctable Error (detected) |

Figure 5:
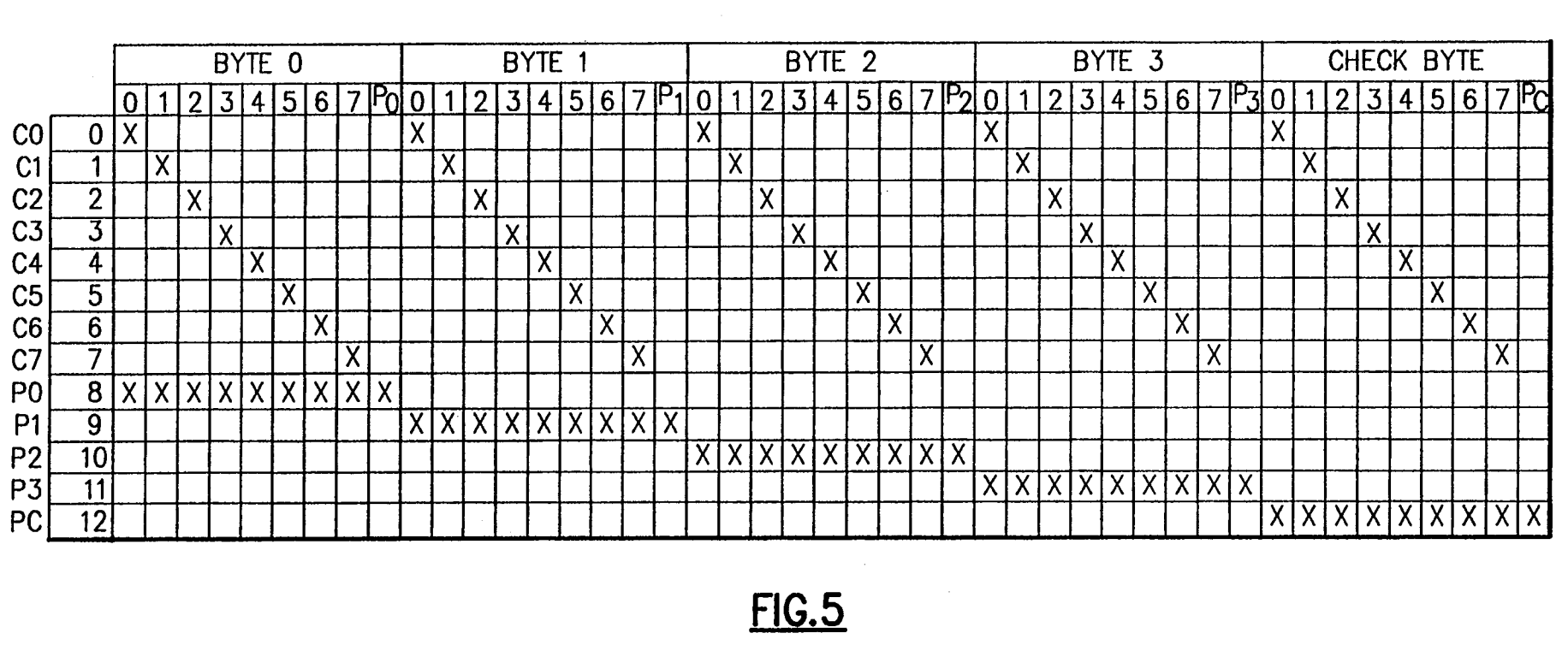

FIG. 5 shows an example of an H-matrix for another single chip multiple bit error correction code. The code illustrated is a (45,32) bit code for full word accesses from a memory system using a "by 9" bit chip, such as a 512 KByte ×9 chip. Thus, in FIG. 5, there are five chips; four data chips and one check chip. The ninth bit following each byte of each chip is a parity bit. As will be appreciated from the description of FIG. 3, the parity bit is optional, provided that the chip is already provided with single bit and multiple bit error detection logic as shown in FIG. 2. In this code, the syndrome bits are the check bits plus the parity bits. Thus, in this code n=45, k=13 and r=32 forming the (43,32) H-matrix shown in FIG. 5.

An examination of FIG. 5 shows a very simple scheme for multiple bit error correction for failures within a byte, where each byte is stored on a separate chip. Each of the first eight bits within the chip (i.e., the "data" bits) are associated with one and only one "check" bit. If a single chip fails, as indicated by that chip's error signal (CES), then any or all of the data bit failures can be corrected by noting which of the corresponding "syndrome" bits is active. Given that only one chip fails, then each possible error has a unique syndrome. The ninth bit within each byte, being a parity bit on the first eight, is used to indicate when a single bit is in error regardless of the state of the chip error signal. Thus, the memory chip error detection logic need not detect single bit failures, as for example an output driver failure.

As an example, suppose that bits 1, 4 and 5 of byte 1 are in error. Using the code of FIG. 5, the resulting syndrome would be the byte 1 chip error detection signal and check bits 1, 4, 5, and P1. This "syndrome" is unique to this error and, therefore, the bits in error can be corrected. Note that the absence of any other chip error signal or parity bit signal indicates that only the byte 1 memory chip has failed, and no others.

As a second example, suppose that bits 1, 4 and 5 of byte 1 are in error and also bit 1 of byte 2. The resulting syndrome is the byte 1 chip error signal with or without the byte 2 error signal and check bits 4, 5, P1, and P2. Correction is not possible since the syndrome is not unique; however, the error is detected without miscorrection.

In the example of the (45,32) code which incorporates a parity bit over each symbol field of each chip's data, the CES is active only when a multiple bit error exists. It is not necessary to activate the CES for single bit errors since the parity bit provides this information directly. The two-level error detection/correction scheme using parity bits is more expensive than, for example, the (36,32) code shown in FIG. 3 without parity bits; however, the addition of parity bits allows for the detection and correction of single failures in connections (wires) between the memory and the error detection logic and also in the off chip drivers. This is not possible without the parity bits unless on-chip logic is provided to compare the output data bits (on the "wire") to the intended data outputs from the memory array 24 (FIG. 2). Also, the chip error detection logic must detect single bit errors as well as multiple bit errors. With parity bits, the chip error detection logic need only detect and activate the CES signal for multiple bit errors.

The error code illustrated in FIG. 5 can be generalized as follows. For memory chips that are bits wide, N−1 bits are used as data and the N bit as parity on the first N−1 bits. In addition, a check bit memory chip is required. The resulting code is N plus M bits wide, where M is the word length divided by N−1. For example, if the chip were 17 bits wide and the word length 64 bits, the resulting code would be 64/16 or 4 plus 17 equal 21 check bits for each 64 data bits; i.e., a (85,64) bit code. Again, when used in conjunction with the chip error signals (CES), a single chip correct, multiple chip detect capability results. In this case, up to 17 concurrent errors can be corrected if all errors are from the same memory chip.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer memory error detection and correction mechanism comprising:

X memory packages in said memory, where X is a number greater than one, each memory package comprising a data array coupled to an error detection logic means and coupled to a data selector means, said data selector means selecting M data output bits out of a string of N data bits read from said data array as a M bit byte of a data word stored in said memory and said error detection logic means detecting multiple bit errors and single bit errors in said N data bits and providing an output error signal indicating a multiple bit error or single bit error in said N data bits from the data array of that package irrespective of whether that error is in said M bit byte of the data word;

a check bit memory package in said computer memory including a data array containing error detection check bits for said data word corresponding to the M data output bits stored in each said X memory packages, said check bit memory package outputting a string of N check bits containing M check output bits, each of which is generated from a different one and only one of the selected M data output bits in each of the X memory packages, and said check bit memory package also including error detection logic means providing an output error signal for indicating a multiple or single bit error in said N check bits containing the M check bits read from said data array of that said check bit memory package; and data bit correction means for said computer memory and responsive to the M data output bits from each of said plurality of X memory packages and the M check output bits from said check bit memory package and also responsive to said output error signals from said X memory packages and said check bit memory package for correcting both multiple bit errors and single bit errors from any one of the X memory packages and also for detecting data bit errors from more than one of said X memory packages.

2. The computer memory error detection and correction mechanism recited in claim 1 wherein said X memory packages are each on separate memory chips having on-chip error detection logic means.

3. A computer memory error detection and correction mechanism comprising:

a plurality of data bit memory packages in the computer memory each package comprising a data array, coupled to an error detection logic means and coupled to a data selector means, said data selector means providing M data output bits selected from N data bits read from said data array and said error detection logic means detecting multiple bit errors and single bit errors in said N data bits and providing an output error signal indicating a multiple bit error or single bit error in said N data bits from the data array of that package;

a check bit memory package in the computer memory including a data array containing error detection check bits corresponding to the M data output bits stored in said plurality of said data bit memory packages, said check bit memory package outputting an N check bit string containing M check output bits protecting one and only one data bit in each of the data bit memory packages, said check bit memory package also including error detection logic means for providing an output error signal indicating a multiple or single bit error in said N check bit string outputted from said data array of said check bit memory package; and data bit correction means responsive to the M data output bits from each of said plurality of data bit memory packages and the M check output bits from said check bit memory package and said output error signals from said data bit memory packages and said check bit memory package for correcting both multiple bit errors and single bit errors from any one of the data bit memory packages and detecting data bit errors from any two or more than one of said data bit memory packages wherein said data bit correction means comprises:

check bit generator means responsive to said M data output bits read from each of said plurality of data bit memory packages for generating M check output bits;

syndrome generator means responsive to the M check bits generated by said check bit generator means and said M data output bits from said data bit memory packages for generating M syndrome bits; and syndrome detector means responsive to said M syndrome bits and to said output error signals from each of said plurality of data bit memory packages and said check bit memory package and to said output error signal from said any one of said data bit memory packages that holds check bits for generating a signal representing no error or a correctable error and a signal representing a non-correctable error as determined by decoding said syndrome bits and said output error signals, said syndrome detector means further including means for generating correct bit signals for single or multiple errors for each one of said data bit memory packages.

4. A computer memory error detection and correction mechanism comprising:

a plurality of data bit memory packages in said computer memory each package comprising a data array coupled to error detection logic means and coupled to data selector means, said data selector means selecting M data output bits out of a string of N data storage bits read from said data array wherein one of the data output bits is a parity bit over all remaining M-1 data output bits and said error detection logic means detecting multiple bit errors in said N data storage bits and providing an output error signal indicating a multiple bit error in said N data storage bits from the data array of that package;

a check bit memory package including a check bit data array containing error detection check bits corresponding to the M data output bits stored in the said plurality of data bit memory packages, said check bit memory package outputting a string of N check bits containing M-1 check output bits each of which is generated from a different one and only one of the M-1 bits in each of the data bit memory packages and also outputting one parity bit over the said M-1 check output bits and said check bit memory package also including error detection logic means for providing an output error signal indicating a multiple bit error in said N check bits from said check bit data array of said check bit memory package; and data bit error detection and correction means in said computer memory responsive to the remaining M-1 data output bits and one parity bit from each of said plurality of data bit memory packages and M-1 check bits and one parity bit from said check bit memory package and said output error signals from said data bit memory packages and said check bit memory package for correcting single or multiple data bit errors from any one of said data bit memory packages and detecting data bit error from more than one of said data bit memory packages.

5. The error detection and correction mechanism recited in claim 4 wherein said plurality of data bit memory packages are each on a separate memory chip having on-chip error detection logic means.

6. A computer memory error detection and correction mechanism comprising:

a plurality of data bit memory packages in the computer memory, each package comprising a data array coupled to error detection logic means and coupled to data selector means, said data selector means providing M data output bits selected from N data storage bits read from said data array wherein one data output bit is a parity bit over all remaining M-1 data output bits and said error detecting logic means detecting multiple bit error in said N data storage bits from the data array of that package;

a check bit memory package in the computer memory including a check bit data array containing error detection check bits each corresponding to one and only one of the data output bits stored in each of the said plurality of data bit memory packages, said check bit memory package outputting N check bits containing M-1 check output bits and one parity bit protecting said M-1 check output bits and said check bit memory package including error detection logic means for providing an output error signal indicating a multiple bit error in said N check bits from the data array of that check bit memory package; and a data bit error detection and correction means coupled to the computer memory responsive to all remaining M-1 data output bits and one parity bit from each of said plurality of data bit memory packages and M-1 check output bits and one parity bit from said check bit memory package and said output error signals from said data bit memory packages and said check bit memory package for correcting single or multiple data bit errors from any one of said data bit memory packages and detecting data bit errors from any two or more of said data bit memory packages wherein said data bit error detection and correction means comprises:

check bit generator means responsive to said all remaining M-1 data output bits read from each of said plurality of said data bit memory packages and said check bit memory package for generating M-1 check output bits;

syndrome generator means responsive to the M-1 check bits generated by said check bit generator means and said M-1 check bits from one of said data bit memory packages and said check bit memory package for generating M-1 syndrome bits;

parity check generator means responsive to said all remaining M-1 data output bits read from each of said plurality of data bit memory packages and said check bit memory package for generating a parity check signal for each of said data bit memory packages and a parity check signal for the check bit memory package; and syndrome decoder means responsive to said M-1 syndrome bits and to said output error signals from each of said plurality of said data bit memory packages and said check bit memory package and to said parity check signals for generating a no error or correctable error signal, or a non-correctable error signal determined by decoding said M-1 syndrome bits and said output error signals, said syndrome decoder means further generating correct bit signals for single and multiple bit errors from said one of said data bit memory packages.

7. In a memory system in which each byte of a memory word is stored in a different array of the memory each array storing data in N bit strings each string protected by a SEC-MED code with single bit error and correction and multiple bit error detection capability, a method comprising the steps of:

a) storing each one of X different, M bit, data bytes of an X+1 byte memory word in a different one of the N bit data strings of said arrays where X and M are numbers greater than one;

b) generating M check bits from bits of the memory word using a different one and only one bit from each of the X different, M bit, data bytes to generate each of the M check bits;

c) storing the M check bits for the data word as part of a N bit string in one of the arrays not used in step a) to store a data byte;

d) reading out all N bit strings mentioned in steps a) and c);

e) selecting the M bits forming a byte of said memory word from each of the N bit strings read out in step d);

f) generating a different pointer for each of the X+1 bytes of the memory word using the SEC-MED code for each array mentioned in steps a) and c), which pointer indicates presence of errors in the N bit data string read out of that array;

g) indicating an incorrectable error when more than one of the X+1 pointers indicates that there is at least one error in more than one of the N bit strings.

h) generating M syndromes using the M bits of the X+1 bytes of the data word when only one of the generated pointers indicates that at least one error has occurred in only one N bit string containing only one of the X+1 bytes; and i) correcting from one to M bits in error in said only one of the X+1 bytes using the M syndromes generated in step h) whereby generation of syndromes capable of detecting multiple errors in step h) and multiple bit error correction in step i) does not rely on and await the operation of the single bit error correction capability of the SEC-MED code.

* * * * *